United States Patent [19]

Yamamoto et al.

[11] Patent Number: 5,007,694
[45] Date of Patent: Apr. 16, 1991

[54] LIGHT WAVELENGTH CONVERTER

[75] Inventors: Osamu Yamamoto; Toshihiko Yoshida, both of Nara, Japan

[73] Assignee: Sharp, Kabushiki Kaisha, Osaka, Japan

[21] Appl. No.: 457,320

[22] Filed: Dec. 28, 1989

[30] Foreign Application Priority Data

Dec. 29, 1988 [JP] Japan ................... 63-334135

[51] Int. Cl.⁵ .............................................. G02B 6/10
[52] U.S. Cl. ..................................... 350/96.14; 372/50
[58] Field of Search .................... 372/50, 22; 307/425, 307/427; 350/96.11, 96.12, 96.14, 96.13

[56] References Cited

U.S. PATENT DOCUMENTS 4,929,042 5/1990 Hatori et al. ...................... 350/96.14

OTHER PUBLICATIONS

K. Ohta et al., Showa 59 nen Shunki Ouyou Butsuri Gakkai 30a-K-5, 1984.

Primary Examiner—James W. Davie
Attorney, Agent, or Firm—Irell & Manella

[57] ABSTRACT

A light wavelength converter comprising a substrate that is made of a material attaining a non-linear effect; an optical waveguide that is formed within said substrate; a light source that irradiates said optical waveguide with a pair of lights having a fundamental waveguide, said pair of lights being propagated within said optical waveguide and intersecting each other within said optical waveguide to thereby generate a second harmonic light; and a light deflection means that changes the intersection angle between the pair of waveguiding lights based on an electric signal that is input into said light deflection means, whereby, the phase matching condition of a pair of incident laser beams can be readily satisfied and, even when the ambient temperature changes, the second harmonic light can be stably generated.

7 Claims, 5 Drawing Sheets

LIGHT WAVELENGTH CONVERTER

BACKGROUND OF THE INVENTION

1. Field of the Invention

The present invention relates to a light wavelength converter, which is used in an information processor, such as an optical memory disc system or a laser beam printer, and an optical application measuring apparatus using laser beams emitted from a semiconductor laser device when the wavelength of the laser beams is converted into a short wavelength zone.

2. Description of the Prior Art

For an information processor, such as an optical memory disc system or a laser beam printer, and an optical application measuring apparatus, the laser beam of a semiconductor device that is superior in condense property and directivity is used. In general, the oscillation wavelength of semiconductor laser devices is 0.78 $\mu$m or 0.83 $\mu$m, the laser beam being near infrared. In recent years, in order to increase the amount of information to be processed in an information processor, or to improve the measurement accuracy of the optical application measuring apparatus, the laser beam has been promoted to be of a short wavelength. For example, in the information processor, such as an optical memory disc system or laser beam printer, the laser beam emitted from the semiconductor laser is condensed at a predetermined place so as to write the information or images. The wavelength of the laser beam and the diameter of focusing spot usually have therebetween a proportional relationship, so that, when the wavelength of laser beam becomes short, the diameter of focusing spot can be reduced. When the diameter thereof is reduced, the amount of information (i.e., the recording density) to be written into the optical memory disc system can be increased. Moreover, the laser beam printer can form micro-images, so that the recording density can be increased and the resolution can be improved. Furthermore, the optical application measuring apparatus reduces the wavelength of the laser beam to enable an improvement in measuring accuracy. The green or blue laser beam of a short wavelength, when obtainable with ease, is combined with the red laser beam now in use, thereby attaining a color operating at high speed and having a high resolution.

In recent years, a semiconductor laser has been developed which uses a semiconductor material of the InGaAlP system and has an oscillating wavelength of about 0.6 $\mu$m. However, a semiconductor laser which can oscillate a green or blue laser beam with an oscillation wavelength of less than 0.6 $\mu$m has not been manufactured because suitable materials are not to be found. For that reason, such a green or blue short wavelength laser beam must be oscillated by a large-scale gas laser such as an argon-ion laser.

Figure 7:
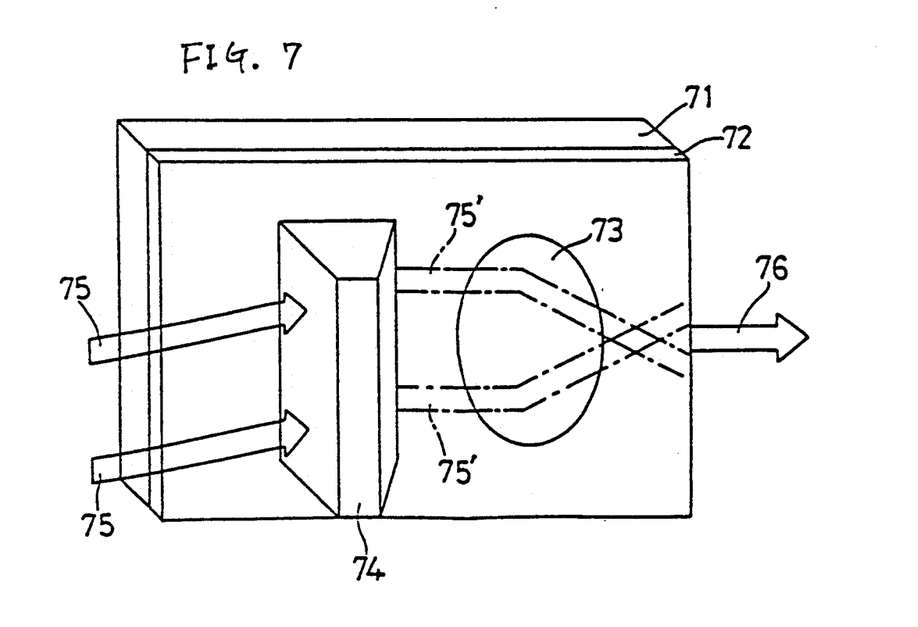
FIG. 7 is a schematic diagram showing a conventional light wavelength converter.

To obtain a green or blue short wavelength laser beam without using such a large-scale gas laser, a light wavelength converter for converting into a short wavelength zone a laser beam oscillated from a solid laser or a semiconductor laser has been proposed by Ohta et al. in the Institute of Applied Physics in spring, 1984. This light wavelength converter utilizes the second harmonic generation (SHG) phenomenon caused by a crystal that attains the optical nonlinear effect and outputs a laser beam of half of the wavelength of the input laser beam. The said light wavelength converter is provided with, as shown in FIG. 7, an optical waveguide 72 that is formed into a plate on a Z-plate LiNbO$_3$ substrate by a Ti diffusion technique. On the optical waveguide 72, a Luneberg lens 73 formed by vacuum deposition of As$_2$S$_3$ and a coupler prism 74 are disposed. The coupler prism 74 guides into the optical waveguide 72 a pair of laser beams 75 (the optical frequency of which is represented by $\omega$) oscillated from, for example, a YAG laser, the laser beams 75 being propagated in the optical waveguide 72. Each waveguiding light 75' propagated in the optical waveguide 72 is refracted so as to intersect with each other. Each waveguiding light 75' is converted at the intersection into a second harmonic light 76 with twice the optical frequency (i.e., half of the wavelength) of the laser beam 75 when a phase matching condition of each waveguiding light 75' is satisfied. The phase matching condition is as follows:

$$2\beta^\omega \cos \theta = \beta^{2\omega},$$

Where in $\beta^\omega$ is the propagation constant of a fundamental wave (the light guided into the optical waveguide, $\beta^{2\omega}$ is the propagation constant of the second harmonic light, and 2$\theta$ is the intersection angle at the intersection between the waveguiding lights.

In the light wavelength converter, the changes of the intersection angle of waveguiding lights 75' by means of the Luneberg lens 73 are carried out by mechanically changing the interval between the pair of laser beams 75, the interval between both the laser beams 75 being so adjusted that the above-mentioned phase matching condition is satisfied.

As mentioned above, in such a conventional light wavelength converter, the interval between a pair of incident laser beams are adjusted and the phase matching condition is satisfied, thereby oscillating the second harmonic light. However, the propagation constant $\beta^\omega$ of the fundamental wave and the $\beta^{2\omega}$ of the second harmonic light change in a sensitive manner with small changes in ambient temperature, whereby it is difficult to quickly adjust the interval between the laser beams incident into the optical waveguide corresponding to the changes in the ambient temperature, so that the phase matching condition cannot be satisfied in a proper response. As a result, the optical intensity of the second harmonic light decreases.

The light wavelength converter forms a optical waveguide at a substrate composed of material having the optical non-linear effect, so that a pair of waveguiding lights propagating in the optical waveguide are intersected to generate the second harmonic light, the converter having light deflection means for changing the direction of each waveguiding light on the basis of an electric signal, thereby attaining the above-mentioned object.

SUMMARY OF THE INVENTION

The light wavelength converter of this invention, which overcomes the above-discussed and numerous other disadvantages and deficiencies of the prior art, comprises a substrate that is made of a material attaining a non-linear effect; an optical waveguide that is formed within said substrate; a light source that irradiates said waveguide with a pair of lights having a fundamental waveguide, said pair of lights being propagated within said optical waveguide and intersecting each other within said optical waveguide to thereby generate a second harmonic light; and a light deflection means that changes the intersection angle between the pair of waveguiding lights based on an electric signal that is input into said light deflection means.

In a preferred embodiment, the light deflection means is one or a pair of diffraction grating couplers.

In a preferred embodiment, the light deflection means is a pair of prisms having an electro-optical effect.

In a preferred embodiment, the light deflection means is a surface elastic wave that is oscillated from a comb-shaped electrode.

In a preferred embodiment, the pair of lights are emitted from a semiconductor laser.

In a preferred embodiment, a pair of reflecting mirrors are disposed behind said semiconductor laser so that said mirrors optically couple said pair of lights emitted from said semiconductor laser.

In a preferred embodiment, the front facet of said semiconductor laser from which lights are emitted is coated with a reflection film that attains a low reflection with respect to said lights, and the rear facet of said semiconductor laser that is positioned opposite to said front facet is coated with a reflection film that attains a high reflection with respect to said lights.

Thus, the invention described herein makes possible the objective of providing a light wavelength converter in which the phase matching condition of a pair of incident laser beams can be readily satisfied and, even when the ambient temperature changes, the second harmonic light can be stably generated.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1A:
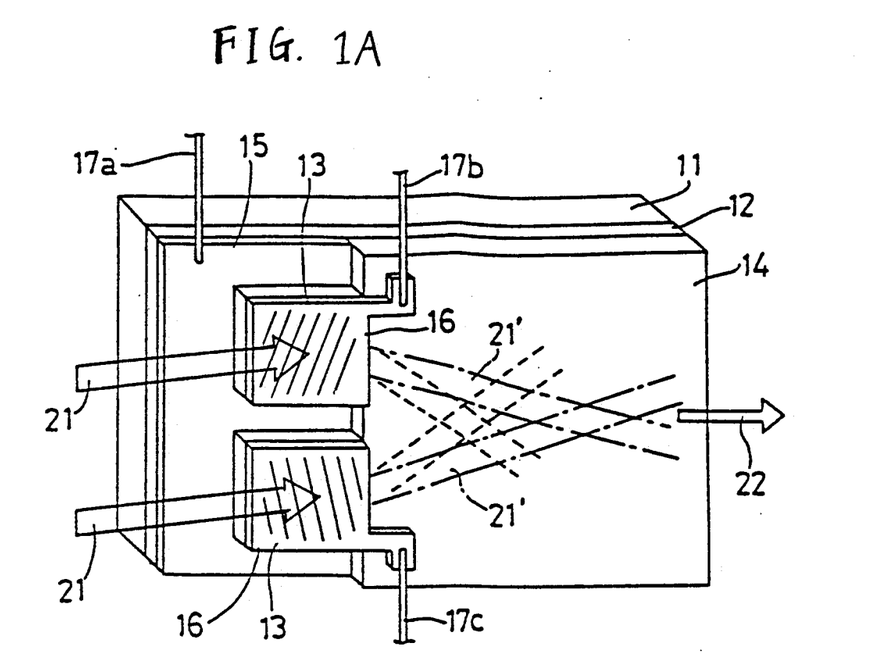
FIG. 1A is a schematic diagram showing a light wavelength converter of this invention.
Figure 1B:
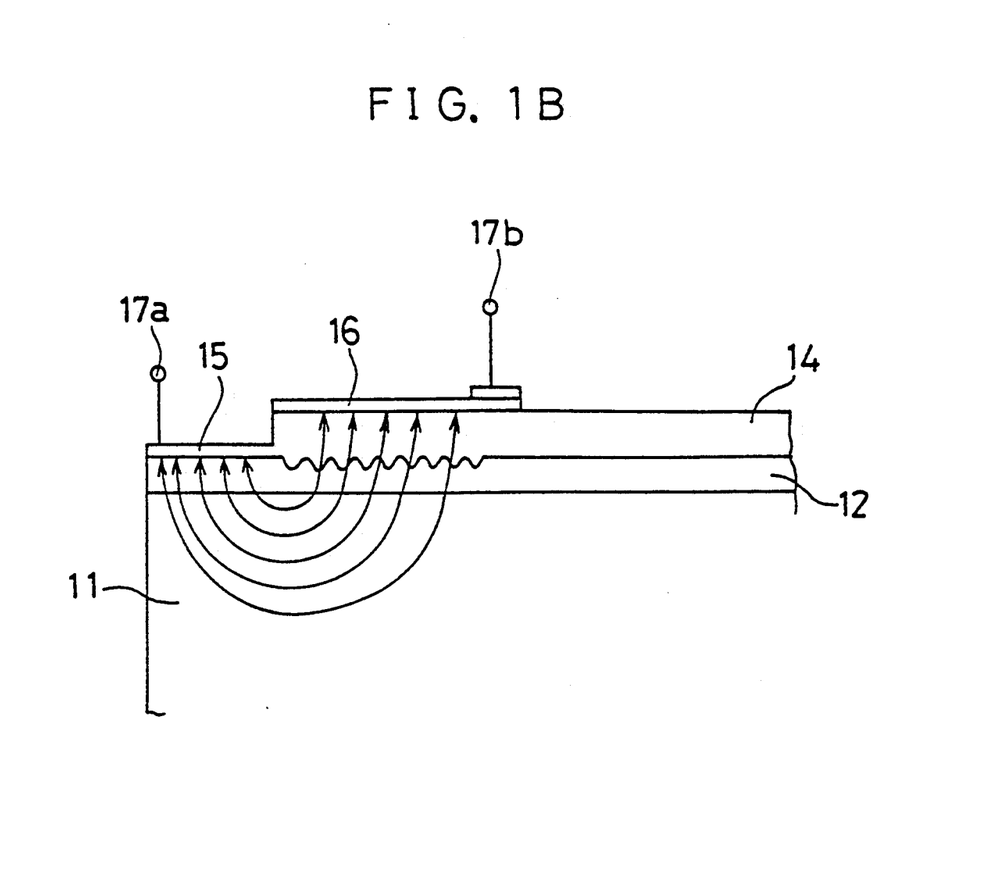
FIG. 1B is a side view showing the light wavelength converter of FIG. 1A.

FIG. 1 shows a light wavelength converter of the present invention, that is provided with a planar optical waveguide 12 that is formed by a proton exchange method on a substrate 11 of Z-plate $LiNbO_3$ attaining the optical non-linear effect. A pair of diffraction grating couplers 13 are formed on the optical waveguide 12 by ECR plasma etching or reactive ion-beam etching, and a $SiO_2$ film 14 is deposited on the optical waveguide 12 except for one end portion in an area where the diffraction grating couplers 13 are disposed. The $SiO_2$ film 14 covers the diffraction grating couplers 13 on the optical waveguide 12, and transparent electrodes 16 of an ITO film are formed on the $SiO_2$ film 14 that covers coating the diffraction grating couplers 13. An electrode 15 of Al is formed on a portion of optical waveguide 12 that is not formed with the $SiO_2$ film 14. Connection terminals 17a, 17b and 17c are connected to the Al electrode 15 and the ITO electrodes 16 formed on the diffraction gratings, respectively.

The light wavelength converter of the abovementioned construction is manufactured as follows: For example, the planar optical waveguide 12 is formed on the Z-plate $LiNbO_3$ by the proton exchange method in which the $LiNbO_3$ substrate 11 is left in pyrophosphoric acid at 220° C. for about 45 minutes, which causes an ion exchange reaction, $Li^+ \leftarrow\!\!\rightarrow H^+$, resulting in a waveguiding layer with a high refractive index. Then, a pair of diffraction grating couplers 13 having a pitch of about 0.5 $\mu$m each, a depth of about 0.1 $\mu$m each and an area of 1 mm square each are formed on the predetermined positions at the optical waveguide 12 by the ECR plasma etching (Japanese Journal of Applied Physics Vol. 19 No. 8, August 1980 pp. L463-L465). Thereafter, a $SiO_2$ film is deposited throughout the surface of the optical waveguide 12 by the sputtering method. Then, a portion of the $SiO_2$ film 14, where the Al electrode 15 is to be formed, is removed by an etching technique and Al is deposited onto the said portion so as to form the electrode 15. An ITO film is formed on the $SiO_2$ film 14 that has been formed on the diffraction grating couplers 13, resulting in transparent electrodes 16. Connection terminals 17a, 17b and 17c are then connected to the electrodes 15 and 16, respectively, resulting in a light wavelength converter of the present invention.

In the light wavelength converter, the laser beams 21 emitted from, for example, a YAG laser enter into the diffraction grating couplers 13, respectively, by which the laser beams 21 are refracted to be a predetermined refraction angle and then guided into the optical waveguide 12. The waveguiding lights 21' propagating within the optical waveguide 12 are intersected with each other in the optical waveguide 12, as shown by the one-dot-chain line in FIG. 1.

When voltage is applied between the electrodes 15 and 16 through the connection terminals 17a, 17b and 17c, the electro-optical effect generates a change in the refractive index of the $LiNbO_3$ substrate 11 so that the intersection angle between the waveguiding lights 21' changes. The voltage applied between the electrodes 15 and 16 is changed to satisfy the phase matching conditions of each waveguiding light 21', thereby emitting a second harmonic light 22 from the intersection of the waveguiding lights 21', the second harmonic light 22 being of half of the wavelength of the laser beam 21 that has been incident to each diffraction grating coupler 13. For example, when the incident laser beam 21 is the YAG laser beam with a wavelength of 1.064 $\mu$m, the second harmonic light 22 becomes a green laser beam with a wavelength of 0.532 $\mu$m.

By this way, while the second harmonic light 22 is emitting, even though the ambient temperature changes to lower the intensity of the second harmonic light, the voltage applied between the electrodes 15 and 16 is changed, so that the intersection angle between the waveguiding lights 21' propagating in the optical waveguide 12 can be changed so as to satisfy the phase matching condition, as shown by the dotted lines, thereby enabling the second harmonic light 22 to have the predetermined intensity of light. In this case, the amount of light of the second harmonic light 22 is detected so as to carry out a feed-back-control of the voltage between the electrodes 15 and 16, so that a quick response to changes in the amount of light of the second harmonics caused by changes in the ambient temperature can be attained and the second harmonic light can be stably emitting.

EXAMPLE 2

Figure 2:
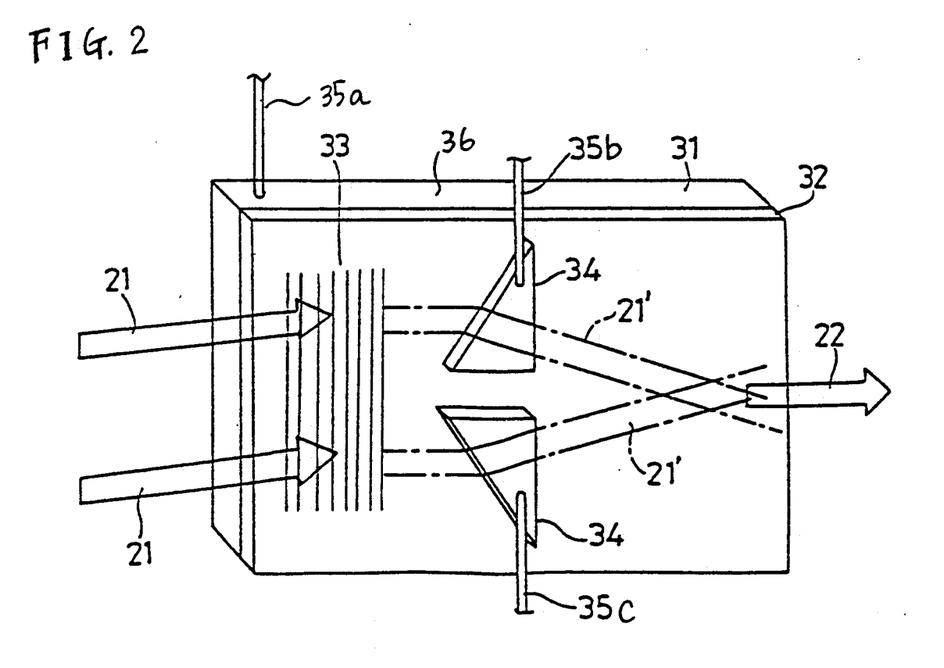
FIG. 2 is a schematic diagram showing another light wavelength converter of this invention.

FIG. 2 shows another light wavelength converter of the invention, which is provided with an optical waveguide 32 on a substrate 31 of, for example, $LiNbO_3$, having the optical non-linear effect, in the same way as that of Example 1. On the back surface of the substrate 31, an electrode 36 made of, for example, Al is disposed, from which a terminal 35a extends. A diffraction grating coupler 33, the grating of which has a pitch of about 0.5 $\mu m$ and a depth of about 0.1 $\mu m$, is provided on the optical waveguide 32. A pair of laser beams 21 that are spaced at a proper interval are irradiated onto the diffraction grating coupler 33 and then guided into the optical waveguide 32 and propagated therein.

On the optical waveguide 32 are provided corresponding to the said optical paths of the laser beams propagating in the said optical waveguide 32 a pair of prisms 34 composed of, for example, $As_2S_3$ having an electro-optical effect. The refractive index of each prism 34 changes in proportion to an electric field arising when a voltage is applied to the prism 34. The prisms 34 and 34 are provided with connection terminals 35b and 35c, respectively, through which voltage is applied to each prism 34.

In this embodiment, the pair of laser beams 21 irradiated to the diffraction grating couplers 33 are guided into the optical waveguide 32 and propagates therein. At this time a predetermined voltage is applied to the prisms 34 through the connecting terminals 35b and 35c, and the waveguiding lights 21' in the optical waveguide 32 are refracted by the prisms 34 respectively, thereby intersecting with each other in the optical waveguide 32, so that the phase matching condition of each waveguiding light 21' is satisfied, and thus, the second harmonic light 22 of $\frac{1}{2}$ wavelength of each waveguiding light 21' is emitted from the intersection of the waveguiding lights 21'.

Also, in this embodiment, voltage applied to each prism 34 is changed so that the refraction index thereof changes by the electro-optical effect, whereby an intersection angle between the waveguiding lights 21' in the optical waveguide 32 changes. Accordingly, the voltage applied to each prism 34 is changed to enable the phase matching condition of the waveguiding lights 21' to be easily satisfied and to quickly respond to changes in the light intensity of the second harmonic light 22 caused by changes in ambient temperature.

EXAMPLE 3

Figure 3:
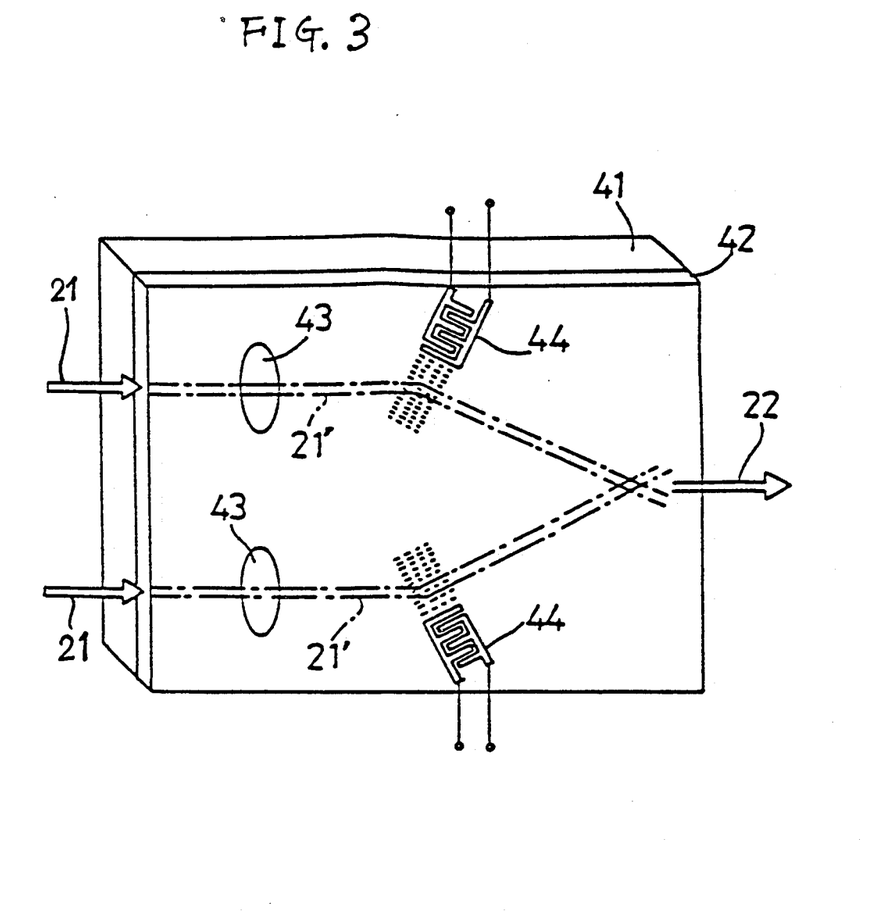
FIG. 3 is a schematic diagram showing another light wavelength converter of this invention.

FIG. 3 shows another light wavelength converter of the invention, which is provided with an optical waveguide 42 on a substrate 41 of $LiNbO_3$ having the optical non-linear effect in the same way as those of the aforesaid examples. A pair of waveguide lenses 43 are disposed on the optical waveguide 42. A pair of laser beams 21 that are incident upon the optical waveguide 42 from the end face of optical waveguide 42 are propagated as the parallel waveguiding lights 21' within the optical waveguide 42.

The optical waveguide 42 is provided with a pair of comb-shaped electrodes 44 in the vicinity of the optical paths of the pair of parallel waveguiding lights 21' that are propagated within the optical waveguide 42. The comb-shaped electrodes 44 act to refract the waveguiding lights 21' by the acoustic optical effect and generate a surface elastic wave when a high frequency alternate voltage is applied thereto. The surface elastic wave generated from each comb-shaped electrode 44 refracts the waveguiding light 21' in the optical waveguide 42 in the same way as that of the aforementioned diffraction grating. The frequency of alternate voltage applied to each comb-shaped electrode 44 is changed so as to change the frequency of the surface elastic wave generated from each electrode 44.

A pair of laser beams 21 that are emitted from a light source (FIG. 5) enter into the optical waveguide 42 from the end face of the optical waveguide 42 and propagated in a parallel manner within the optical waveguide 42 by the waveguiding lenses 43. The waveguiding lights 21' are refracted by the surface elastic waves from the comb-shaped electrodes 44 and intersected with each other in the optical waveguide 42. At this time, the frequency of the alternate voltage applied to each comb-shaped electrode 44 is changed, thereby changing the frequency of the surface elastic wave generated from each comb-shaped electrode 44 and changing the refraction angle of each waveguiding light 21', so that the phase matching condition of each waveguiding light 21' can be satisfied. Hence, a second harmonic light 22 with half of the wavelength of the waveguiding light 21' generates from the intersection between the waveguiding lights 21'.

Even when the intensity of the second harmonic light 22 changes due to a change in the ambient temperature, the frequency of an alternate voltage applied to each comb-shaped electrode 44 is changed to enable the intensity of the second harmonic light 22 to be of a predetermined value.

In this embodiment, when the oscillating wavelength of the laser beam emitted from the light source is 840 nm, a second harmonic light 22 that is blue with a wavelength of 420 nm generates.

Instead of the comb-shaped electrodes 44, the prisms of Example 2 can be used, which attains the same effect as that of Example 2.

EXAMPLE 4

Figure 4:
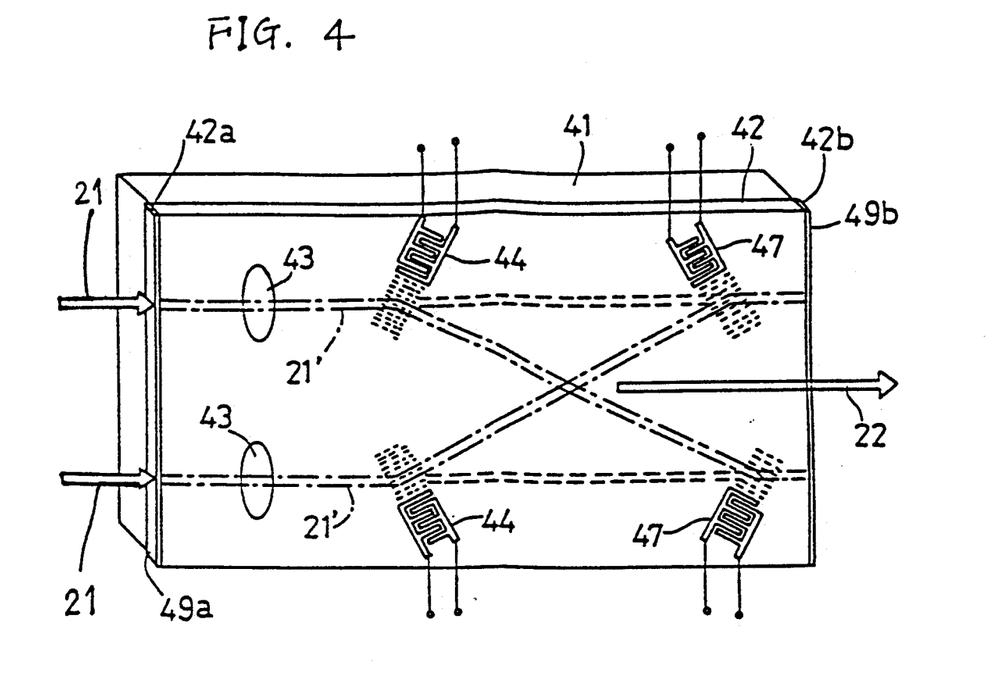
FIG. 4 is a schematic diagram showing another light wavelength converter of this invention.

FIG. 4 shows still another light wavelength converter of the invention, in which in the same way as those of Example 3, a pair of laser beams incident upon an optical waveguide 42 are propagated in a parallel manner within the optical waveguide 42 by waveguide lenses 43 optical waveguide 42 and the waveguiding lights 21' are refracted by the surface elastic waves generating from the comb-shaped electrodes 44 so as to intersect each other, thereby generating the second harmonic light 22. In the present embodiment, comb-shaped electrodes 47 are disposed outsides of the optical paths of the waveguiding lights 21' beyond the intersection thereof at which the waveguiding lights 21' are not converted into the second harmonic light 22 and through which the waveguiding lights 21' pass.

When a high frequency alternating voltage is applied to each comb-shaped electrode 47, the comb-shaped electrode 47, in the same as the comb-shaped electrode 44, generates the surface elastic wave so that each waveguiding light 21' is refracted thereby toward the light-emitting end face 42b of the optical waveguide 42 so as to be perpendicular to the light-emitting end face 42b. The outgoing side end face 42b at the optical waveguide 42 is coated with a reflection film 49a that attains a low reflection with respect to the second harmonic light and a high reflection with respect to the waveguiding light 21' of the optical waveguide 42. As a result, each waveguiding light 21' refracted by each comb-shaped electrode 47 is reflected by the light-emitting end face 42b so as to return to the optical waveguide 42. The power density of light with a fundamental wave increases more than double by a resonant effect, so that the output power of the resulting second harmonic light increases. Since the output power of the second harmonic light is proportional to the square of the power density of the fundamental wavelength light, the output power of the second harmonic light becomes more than 4 times. The laser beam incident end face 42a of the optical waveguide 42 is coated with a reflection film 49a that attains a low reflection with respect to the laser beam 21 and a high reflection with respect to the second harmonic wave.

These films are composed of alternate layers consisting of two $Al_2O_3$ layers with a thickness of $$\left(\frac{2m+1}{4}\right) \times \text{wavelength (wherein } m \text{ is an integer)}$$

and two $TiO_2$ layers with a thickness of $$\left(\frac{2n+1}{4}\right) \times \text{wavelength (wherein } n \text{ is an integer).}$$

When the thickness of the $AL_2O_3$ layer and the $TiO_2$ layer are set to be 0.83 μm, the reflection film has a high reflection. When the thickness of the $Al_2O_3$ layer and the $TiO_2$ layer are set to be 0.415 μm, the reflection film has a low reflection.

The waveguiding lights 21' propagated in the optical waveguide 42, intersect each other in the same way as that of Example 3 shown in FIG. 3 and part of each waveguiding light 21' emits as the second harmonic light 22, at which time each waveguiding light 21' that is not converted into the second harmonic light 22 passes through the intersection and thereafter refracted by the comb-shaped electrode 47 and reflected by the light-emitting end face 42b of the optical waveguide 42. The reflected light travels in the opposite direction in the optical path of the waveguiding light that has been incident upon the optical wavelength from the incident end face 42a, and then returns to the light source.

The pair of laser beams 21 emits from the light source such as a semiconductor laser array are not optically coupled. The waveguiding lights 21' propagated in the optical waveguide 42 are refracted to intersect each other by the surface elastic wave oscillated by the comb-shaped electrodes 44. A portion of the refracted waveguiding light 21' is refracted by one comb-shaped electrode 47, which is positioned ahead of the comb-shaped electrode 44 the acts to refract the other waveguiding light 21', and is optically coupled with a portion of the other waveguiding light 21' that travels straight forward without being refracted by the corresponding comb-shaped electrode 44 and the said one comb-shaped electrode 47.

In the aforesaid examples, the substrate that attains the optical non-linear effect is composed of $LiNbO_3$, which may alternatively be composed a semiconductor material, such as ZnS or ZnSe, having an optical non-linear effect, an inorganic material, such as KTP, KDP, ZnO, BNN or BOO, or an organic material, such as MNA or POM, having the same effect.

EXAMPLE 5

Figure 5:
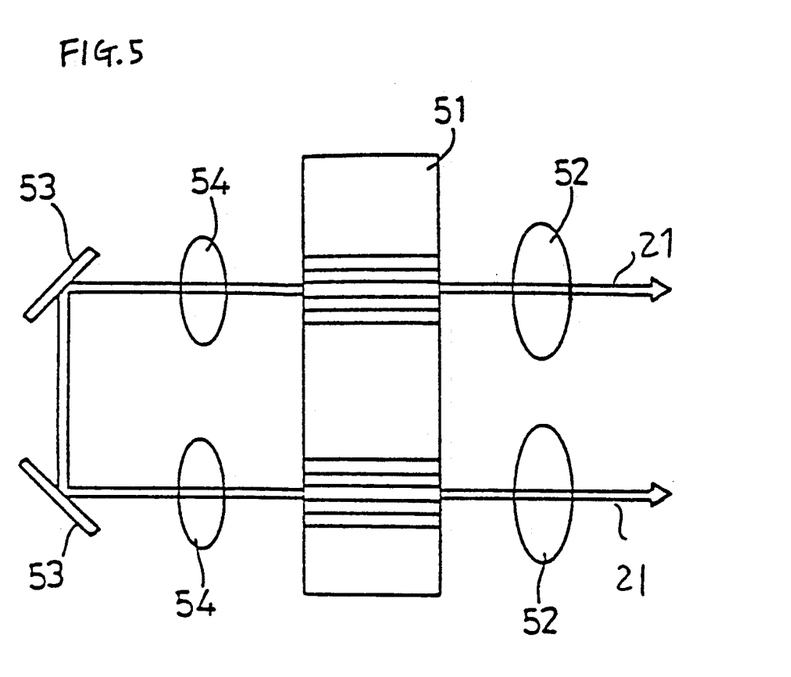
FIG. 5 is a schematic diagram showing a light source used in the light wavelength converter of this invention.

FIG. 5 shows a light source that irradiates the above-mentioned light wavelength converter with a pair of laser beams 21 from, for example, a semiconductor laser array 51 through optical systems 52. The semiconductor laser array 51 is provided at the surface thereof opposite to the laser oscillation surface of the light wavelength converter with a pair of reflecting mirrors 53 and a pair of lenses 54 in order to equalize the oscillation wavelengths of these laser beams 21 emitted from the semiconductor laser array 51, the lenses 54 and reflecting mirrors 53 optically coupling the pair of laser beams 21 oscillated from the semiconductor laser array 51. Concave mirrors can be, of course, used instead of the reflecting mirrors 53. Also, the laser beams incident to the light wavelength converter is not limited to that oscillated from the semiconductor laser array, but can alternatively be the laser beams oscillated from the facets of a single stripe type semiconductor laser.

EXAMPLE 6

Figure 6:
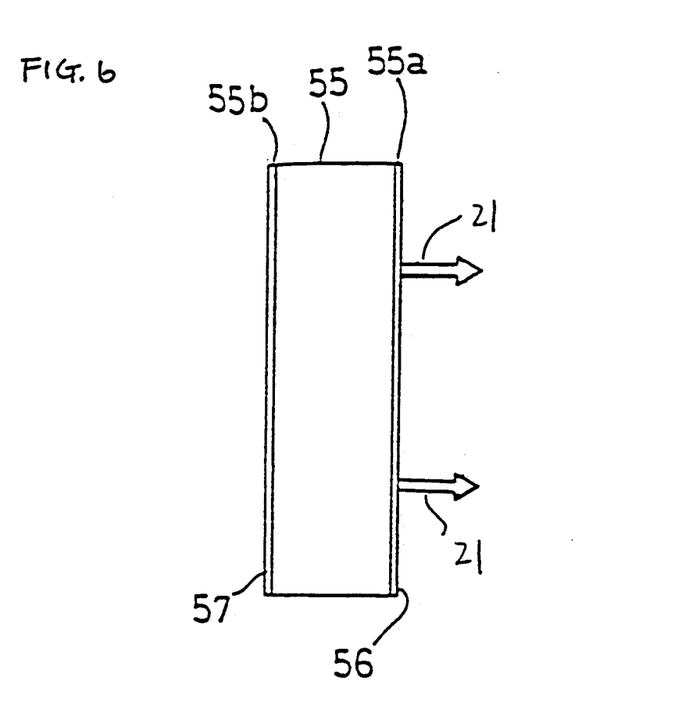
FIG. 6 is a schematic diagram showing another light source used in the light wavelength converter of this invention.

FIG. 6 shows another light source that irradiates the above-mentioned light wavelength converter with a pair of laser beams 21 emitted from, for example, a semiconductor laser array 55. The light-emitting facet 55a of the semiconductor laser array 55 is coated at the laser with a reflection film 56 that attains a low reflection with respect to the laser beam to be oscillated, and the light-reflecting facet 55b of the laser array 55 is coated with a reflection film 57 that attains a reflection with respect to the laser beam to be oscillated.

When a pair of laser beams 21 are emitted from the facet 55a of the semiconductor laser array 55 toward the light wavelength of the light wavelength converter, since the other facet 55b of the semiconductor laser array 55 is coated with the reflection film 57, no laser beam is emitted from the facet 55b.

Since the light wavelength converter of the invention has a light deflection means for changing on the basis of an electric signal the direction of the waveguiding light intersecting within the optical waveguide, the phase matching condition of each waveguiding light can be easily satisfied on the basis of the electric signal, which enables the second harmonic light to be oscillated with ease. Moreover, changes in the intensity of the second harmonic light caused by changes of the ambient temperature can easily and quickly be corrected.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A light wavelength converter comprising a substrate that is made of a non-linear optics material; an optical waveguide that is formed on the surface of said substrate; a light source that irradiates said optical waveguide with a pair of lights having a fundamental wavelength, said pair of lights being propagated within said optical waveguide and intersecting each other within said optical waveguide to thereby generate a second harmonic light; and a light deflection means that changes the intersection angle between the pair of lights based on an electric signal that is input into said light deflection means.

2. A light wavelength converter according to claim 1, wherein said light deflection means is one or a pair of diffraction grating couplers.

3. A light wavelength converter according to claim 1, wherein said light deflection means is a pair of prisms having an electro-optical effect.

4. A light wavelength converter according to claim 1, wherein said light deflection means is a surface elastic wave that is oscillated from a comb-shaped electrode.

5. A light wavelength converter according to claim 1, wherein said pair of lights are emitted from a semiconductor laser.

6. A light wavelength converter according to claim 5, wherein a pair of reflecting mirrors are disposed behind said semiconductor laser so that said mirrors optically couple said pair of lights emitted from said semiconductor laser.

7. A light wavelength converter according to claim 5, wherein the front facet of said semiconductor laser from which lights are emitted is coated with A reflection film that attains a low reflection with respect to said lights, and the rear facet of said semiconductor laser that is positioned opposite to said front facet is coated with a reflection film that attains a high reflection with respect to said lights.

* * * * *